United States Patent [19]

Santicchi

[11] Patent Number: 5,238,116
[45] Date of Patent: Aug. 24, 1993

[54] OVERHEAD CONVEYOR BELT FOR SORTING CLOTHING ITEMS LOADED RANDOMLY ON THE SAME

[75] Inventor: Augusto Santicchi, Frazione San Sisto, Italy

[73] Assignee: METALPROGETTI di Santicchi Augusto & C. - S.n.c., Perugia, Italy

[21] Appl. No.: 890,141

[22] Filed: May 29, 1992

[30] Foreign Application Priority Data

Jun. 3, 1991 [IT] Italy .......................... AN91A000015

[51] Int. Cl.⁵ .............................................. B07C 5/02
[52] U.S. Cl. .................................. 209/3.3; 209/937; 209/583; 198/465.4; 198/463.6
[58] Field of Search ............... 209/3.1, 3.3, 937, 583, 209/657; 198/465.4, 349, 463.6

[56] References Cited

U.S. PATENT DOCUMENTS

| | | | |
|---|---|---|---|
| 2,997,133 | 8/1961 | Gehrke | 198/349 |
| 3,799,318 | 3/1974 | Dekoekkoek | 198/463.6 |
| 4,018,327 | 4/1977 | Goodman et al. | 198/465.4 |
| 4,875,416 | 10/1989 | Duce | 198/465.4 |
| 5,058,750 | 10/1991 | Graese | 209/937 |
| 5,076,417 | 12/1991 | Santicchi | 198/465.4 |
| 5,125,513 | 6/1992 | Branch | 198/465.4 |

*Primary Examiner*—H. Grant Skaggs
*Attorney, Agent, or Firm*—Leonard Bloom

[57] ABSTRACT

An overhead system for sorting clothing items held by hooks, having a closed circuit conveyor belt with openings which carries the single items to the final station. The items—loaded randomly and in large quantities on the system—are transported to this belt one at a time, after having been separated from the others and identified electronically within specific operating stations installed before the conveyor belt. A first operating station has a pair of rods which slide vertically and select a single item to advance onto the conveyor belt. An optical reader is at a second operating station to identify each item. A series of extracting units are installed along the belt to unload the item form the belt.

6 Claims, 3 Drawing Sheets

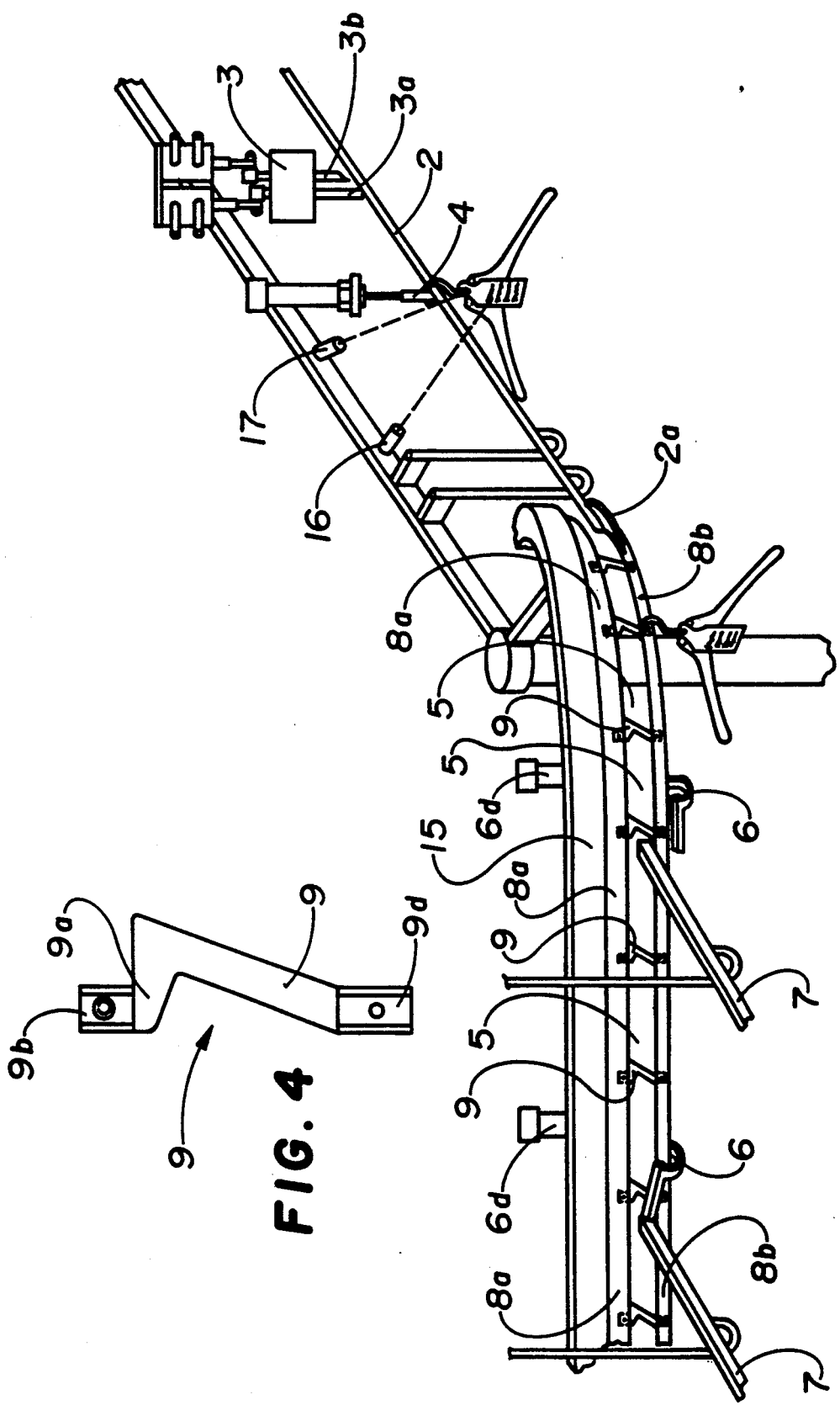

5,238,116

OVERHEAD CONVEYOR BELT FOR SORTING CLOTHING ITEMS LOADED RANDOMLY ON THE SAME

SUMMARY

This invention concerns an overhead system for sorting clothing items held by hooks, having a closed circuit conveyor belt with openings which carries the single items to the final stations; the items—loaded randomly and in large quantities on the system—are transported to this belt one at a time, after having been separated from the others and identified electronically within specific operating stations installed before the conveyor belt.

This patent application concerns an overhead conveyor belt for sorting clothing items loaded randomly on the same.

The device in question is designed to optimize the sorting of large quantities of items—such as clothing—which have to be moved in factories or storing and shipping warehouses, on hooks or hangers.

Currently, in order to handle large quantities of the above type of items, large overhead closed circuit conveyor belts are used, on which the items can be conveniently transferred from one place to another or simply grouped before shipment.

Although these systems are efficient for transport and stocking of the items, they do not allow an automatic selection of the same, when for example, it is necessary to transfer them to another warehouse system or unloading station.

In this regard, it should be pointed out that the automatic selection of the items is intended as the possibility of a conveyor system to automatically identify one or more items with the same characteristics among the randomly loaded items, and to transport these only to a specific work station.

The system according to the invention was designed for this very purpose in order to provide this feature large overhead conveyor belts do not have; the system according to the invention can in fact automatically sort randomly loaded items.

Ideally this new device should be used together with the above overhead conveyor systems, from which it receives large quantities of randomly loaded items in order to sort them and transport them to specific stations; the sorting machine according to the invention can however be used without any problem together with other systems and in other fields, since a manual loading of items is also possible.

The system in question consists of an overhead conveyor belt with openings, having an automatic loading device which transports the support hook of each item into the openings of the conveyor so that this hook hangs from the respective opening and moves forward—carrying the item—together with the entire conveyor belt.

It should be underlined that in order to avoid an uncontrolled transport of the items to sort towards the conveyor belt of the system according to the invention, the latter has a station which temporarily stops the majority of incoming items and allows only one item at a time, namely the first of the row, to move towards the belt with openings to which it hooks.

In order to unload the items hooked to the conveyor belt—on the new system in question—a series of deflecting baffle plates, one for each unloading station, automatically disengage and remove the hooks supporting the items to be sorted, from the conveyor belt openings in which they were previously hung.

The entire operation of this system is controlled by an electronic control board which, according to the sorting programme set, instantaneously determines the relevant unloading station for each item entering the system.

In particular, this control board receives the data for the code of the item transported to the openings, from an optical reader; a second detector accurately reads the order number—along the belt—of the opening on which said item is loaded.

Since the control board has the data regarding the compartment number between each unloading station and the point—which is fixed—at which the item is hooked to the belt, the same knows, at all times, the position of the opening along the belt in which the item to be sorted has been hung.

This allows the control board to know exactly when an item transits in front of its end station; therefore only then will the control board transmit the command to activate the deflecting baffle plate set to unload the items at that particular station.

For major clarity the description of the invention continues with reference to the enclosed drawings, which are intended for purposes of illustration and not in a limiting sense, whereby:

FIG. 3 is similar to FIG. 1, with the only difference that the system version illustrated has an alternative construction embodiment of the conveyor belt.

FIG. 4 illustrates one of the brackets used in the system version of FIG. 3.

Figure 1:
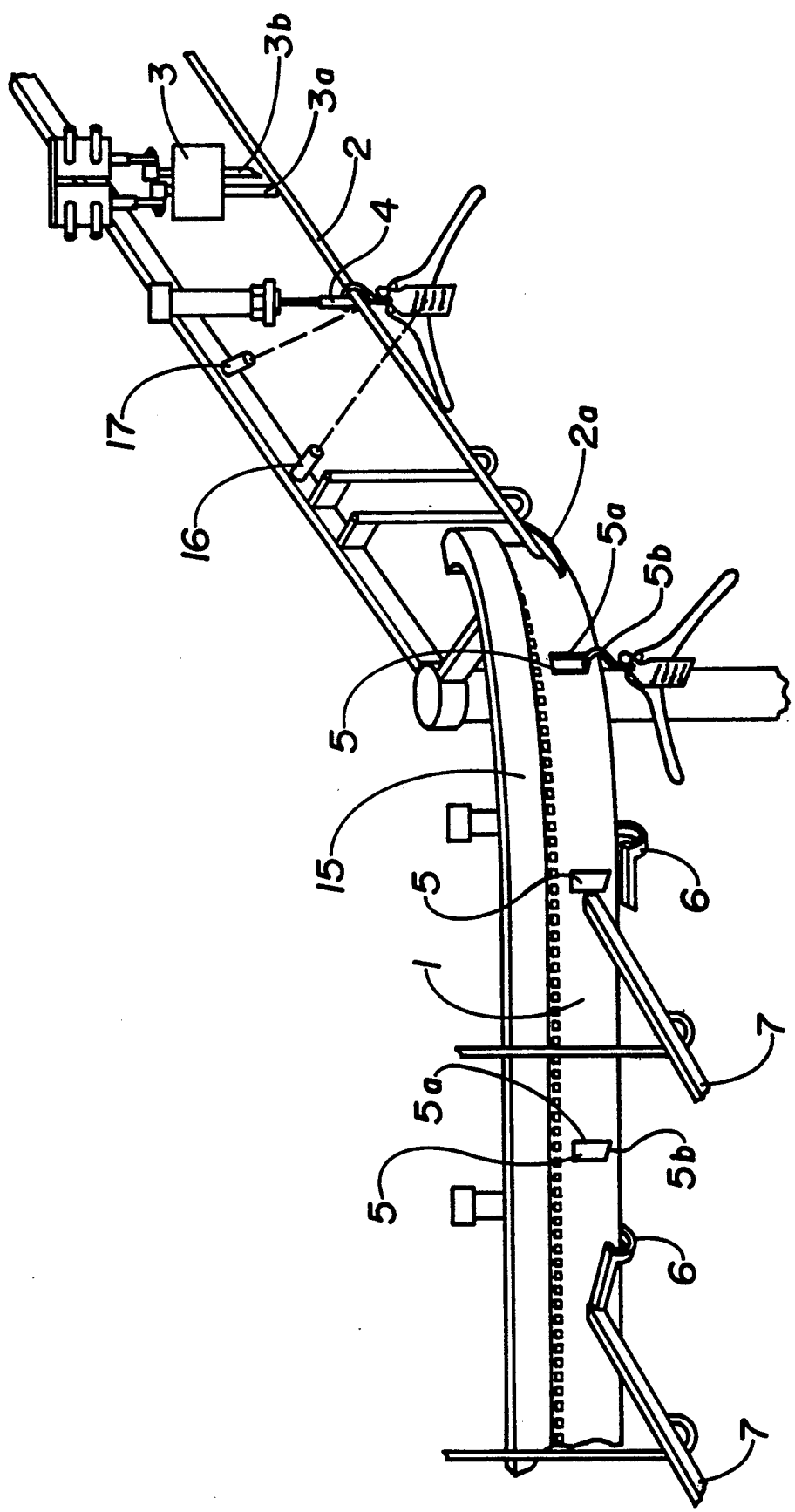
FIG. 1 is an axonometric view of the entire system according to the invention.

With reference to FIG. 1, the device according to the invention consists of an overhead system for sorting items held by hooks, having a closed circuit conveyor belt with openings (1) which carries the single items to the final station; the item—loaded randomly and in large quantities on the system—are transported to this belt one at a time, after having been separated from the others and identified electronically within specific operating stations installed before the conveyor belt (1).

In particular, all these hooks for supporting the items to be sorted are placed at the top end of a slanted track (2) which allows the items to slide towards the overhead conveyor belt (1) supported by an adequate metal structure (15). These items which are still randomly loaded, are stopped as they slide downwards, as a result of the opposition of a pair of adjacent rods (3a and 3b), both sliding vertically—by means of pneumatic actuators respectively—in a support and guide block (3) positioned along the slanted track (2).

It should be noted that in fact the hooks stop against the rod (3a) which is the only one which in this phase is lowered and touches the surface of the track (2) with its tip; contrary to this, during this phase the rod (3b) remains lifted with respect to the track (2) and therefore does not interfere in any way with the hooks.

The latter rod (3b) has a flute mouth tip positioned so that its slanted cross-section is turned towards the upper part of the track (2); said tip—when the relevant rod (3b) is lowered—wedges between the hook of the first item and the hook of the second item abutting against rod (3a); in this way, said tip can separate the first hook of the row from the successive hooks and at the same time it prevents—at least while it remains in this position—the other hooks of the row following the first from sliding. The subsequent lifting of the rod (3a) will only make the first item of the row slide downwards, in view of the fact that all the others are held by the rod (3b); as soon as the first item slides downwards, the rod (3a) is lowered again and the rod (3b) lifts immediately to allow the entire row of hooks on the track (2)—which are now free from its opposition—to slide forward by one step and stop against the rod below (3a).

By repeating this action—starting from the intervention of the flute mouth tip of the rod above (3b) to separate the first hook of the row—it is possible to transport the items one at a time towards the sorting conveyor belt. It should however be pointed out that between the pair of rods (3a) and (3b) and the conveyor belt (1), there is a further stopping station—in this case for single items—at which the identification code is read by an optical reader (16); the item is stopped by means of a pneumatic guillotine (4) which lowers against the track (2) to hold the item for only the length of time required to read the code and then lifts immediately to release the item for the last section of the descent which carries it to the belt (1).

Installed with this guillotine (4) there is a sensor (17) which detects the presence—at the detecting station—of each single item, and which prevents a second item from entering the station before the reading of the first has been completed; in other words, only when the guillotine (4) allows the item which has been read to slide on, will the pair of rods (3a) and (3b) allow another item to slide in.

At the bottom end, track (2) terminates with a conveyor unit (2a) positioned very close to the conveyor belt (1) of the system in question and at the same height—on the same belt (1)—of the openings (5) for coupling the hook of the transported item.

In fact, when an item is released from the opposition of the guillotine (4), it slides up to said conveyor unit (2a) abutting against the belt (1) positioned immediately before the same, until the transit—in front of this unit (2a)—of an opening (5) allows the hook to slide forward, corresponding to the automatic engagement of the hook on the opening (5).

The unloading of a hook at the final station is performed by an extracting unit (6), consisting of a horizontal oscillating blade positioned immediately close the external wall of the belt (1) and at a height immediately under the bottom side of each opening (5).

If the item is not to be unloaded, said extracting unit (6) remains in its horizontal rest position, without opposing the passage of the hook with item in transit; if, on the contrary, the item is to be unloaded at its station, said unit (6) turns over, forming with its top profile, a slanted ascending plane which allows the hook to be extracted from its window (5) and transported towards the mouth of a descending track (7) which carries it towards another station.

It should be pointed out that the extraction of the hook occurs thanks to its progressive lifting along the slanted plane provided by the extracting unit (6) when the same is lifted, followed by a rotation towards the exterior—at the end of this ascending run—due to the opposition that the vertical rear side (5a) of the respective window (5) determines on the same as it moves forward.

Mention should be made of the particular inclination provided by the bottom side (5b) of each opening (5), which is slanted downwards and backward with respect to the moving direction of the belt (1); this inclination is designed to ensure that all the hooks of the hangers on the belt (1) automatically occupy exactly the same position on the respective windows (5), abutting against the rear vertical side (5a) of these, so that the latter can provide to its respective hook—when the same is extracted—the drive necessary to rotate outwards thereby being discharged completely.

Figure 2:
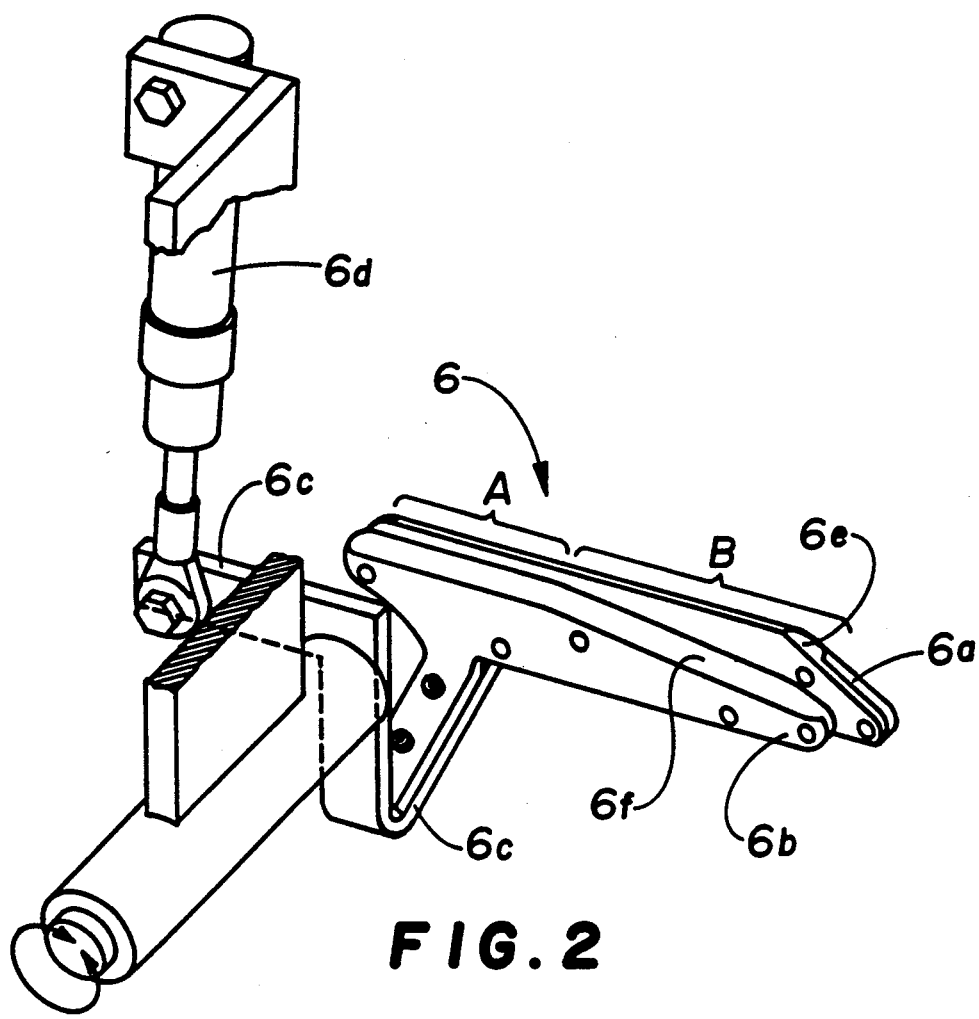
FIG. 2 is a detailed prospective of a preferred embodiment of the extracting unit used on the system according to the invention.

With particular reference to FIG. 2, the extracting unit (6) consists of an adjacent and parallel pair of metal blades (6a) and (6b) positioned close to each other, to allow the conveyor belt (1) to move forward in the space between the same.

Said pair of blades (6a) and (6b) are fixed to the same lever (6c) which is operated by a pheumatic actuator (6d); outside said blades (6a) and (6b) there are two plastic tabs having a suitably shaped top edge which overlaps the top edge of the blades (6a) and (6b).

The tab (6e), namely the one installed on the external blade (6a) of the extracting unit (6) (i.e. on the blade positioned on the unloading side of the items), has a different profile with respect to the opposing tab (6f).

In particular, the top edges of said tabs are, for the first section (A) of the extracting unit (6), adjacent and parallel, while at the end section (B) of the extracting unit (6), the top edge of the internal tab (6f) moves away gradually from the top edge of the external tab (6e), slanting downwards.

This particular shaping of the edges of the tabs (6e) and (6f) is designed to allow the progressive rotation outwards of the hanger hook during unloading, so that said hook positions itself correctly to enter, without jamming, the descending unloading track (7).

In fact, during its ascent along the extracting unit (6) which is lifted, the hanger hook progressively loses its contact with the top edge of the internal tab (6f), so as to be overturned by two forces, being in one instance the drive of the conveyor fitted at the middle of the top of the hook and in the other the friction provided by the top edge of the external tab (6e) at the closed curved side of the hook.

Finally, it can be said that, without going beyond the inventive idea, the conveyor belt (1) could have another construction embodiment.

With particular reference to FIG. 3, it can be noted that in this version, said conveyor could consist of a pair of parallel and spaced identical metal belts having a compact height (8a) and (8b) joined by upright brackets (9) having a particular profile, positioned at regular intervals.

In this case, the openings (5), which in the version of the invention illustrated in FIG. 1, were slotted directly on the surface of a metal belt having a considerable height, are delimited at the top and at the bottom respectively by the bottom edge of the top belt (8a) and by the top edge of the bottom belt (8b), and at the side by two adjacent upright brackets (9).

As can be seen in FIG. 4 each of these brackets (9) has a "7" shaped profile whose concavity is turned towards the moving direction of the system; this profile ensures, without interruptions and jamming, the best drive for the hanger hooks during their ascent along the extracting units (6), before they are unloaded from the system.

In fact, at the top, each bracket (9) has a short horizontal wing (9a) which exactly mates with the bottom edge of the top belt (8a) and is fixed to the same by a top plate (9b) projecting vertically from the same; the bottom edge of this wing (9a) is slanted backwards towards the bottom, thereby ensuring a perfect mating with a long wing (9c) which slants forwards, and whose end terminates with a second vertical plate (9d) for fixing the same to the bottom belt (8b).

Figure 5:
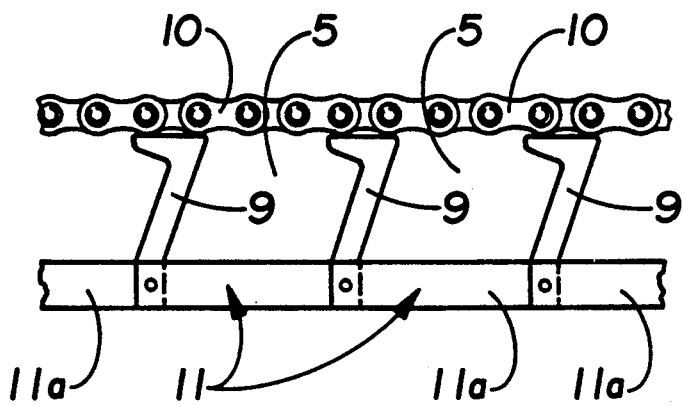
FIG. 5 illustrates a section of another embodiment of the conveyor belt with openings which can be used on the system in question.

It is interesting to note that the latter construction embodiment of the driving element of the system in question is extremely versatile, since only the bottom belt (8b) complete with its relevant series of supporting brackets (9) can be successfully applied on a conventional chain, a cable or any other closed circuit transporting system that can be used on overhead conveyor belt systems. With particular reference to FIG. 5, it should be pointed out that the system in question could employ a different construction embodiment of the belt with openings when the latter has to follow steep descending or ascending sections on the system; in these situations, the above belts could not be used successfully. The latter version of the driving and transport element consists of a top chain (10) and a bottom segmented belt (11), joined by a series of brackets, preferably of the above type (9). In particular, each of these brackets (9) is fixed to the chain (10) at its top horizontal wing (9a), while two successive segments of the segmented belt (11), which can rotate, are hinged at its bottom end. Each of the belt (11) segments (11a) is in fact hinged between two of these brackets (9); consequently, a segment of this type (11a) can slant, within its vertical plane, upwards and downwards, so as to move into an ascending or descending position, as required, which allows it to adapt easily to the steep descending or ascending sections along the system.

I claim:

1. An overhead conveyor belt system for sorting items carried on a hook means, the items being loaded randomly on the belt system, the system comprising:

a slanted feed track (2) which allows the items hooked on the feed track to slide towards a conveyor belt, the conveyor belt having an external wall, the slanted feed track having a bottom end, a conveyor unit (2a) at the bottom of the slanted feed track, the conveyor unit positioned very close to the conveyor belt (1);

a first operating station positioned along the feed track (2), a block (3) in the first operating station supporting and guiding a pair of adjacent rods (3a) and (3b), said rods sliding vertically and independently by means of respective actuators, said rods stopping the items hooked to the track (2) from moving forward, thereby allowing said items to slide down one at a time; one rod (3b) having a flute mouth tip, the tip having a slanted cross-section, the one rod being positioned so that the slanted cross-section of the tip is turned upwards with respect to the track (2);

a second operating station positioned along the slanted feed track (2), disposed after the block (3), the second operating station having a pneumatic guillotine (4) which stops the single items from the first operating station from sliding downwards, each item having an identification code, an optical reader for reading the identification code of the item which has been stopped by the guillotine (4) and a sensor for detecting the presence of an item abutting against the guillotine (4) in order to prevent the entry of a second item into the second operating station before the first item has been released;

the conveyor belt sliding in a closed circuit, along a metal supporting and guide structure, the conveyor belt having a series of identical openings (5) spaced at regular intervals, the openings (5) being used for attaching the hooks of the items to be sorted;

a series of extracting units (6) installed along the belt (1) at the stations where the items to be sorted are unloaded; each of the extracting units (6) having an oscillating horizontal blade placed immediately close to the external wall of the belt (1) and at a height immediately below the bottom side of each opening (5); in order to allow unloading of the item hooked into a selected opening (5) on the belt (1), each of the extracting units (6) can overturn so as to define, with its top profile, a slanted ascending plane which allows the extraction of the hook from the selected opening (5), the hook being then carried to the mouth of a descending track (7) which takes the item on the hook to another destination.

2. An overhead conveyor belt system, for storing items loaded randomly, according to claim 1, wherein the extracting unit (6) has an adjacent and parallel pair of metal blades (6a) and (6b), positioned close to each other to allow the conveyor belt to slide between said blades, said blades both being fixed on a lever (6c), said lever being operated by a pneumatic actuator (6d), each blade having a top edge, an external plastic tab (6e) and an internal plastic tab (6f), each tab having a suitably shaped top edge which overlaps the top edge of the respective blades (6a) and (6b); the top edges of said tabs (6e) and (6f) for a first section (A) of the extracting unit (6) being adjacent and parallel, while in an end section (B) of the extracting unit (6), the top edge of the internal tab (6f) moves away gradually from the top edge of the external tab (6e), slanting downwards.

3. An overhead conveyor belt system for sorting items loaded randomly according to claim 1, wherein the conveyor belt has a pair of parallel and spaced-apart identical metal belts, a top belt and a bottom belt, the belts having a compact height (8a) and (8b) joined by a plurality of upright brackets (9) positioned at regular intervals.

4. An overhead conveyor belt system for sorting items loaded randomly according to claim 3, wherein each of the upright brackets (9) used for connecting the two parallel belts (8a) and (8b) has a top and a bottom and further, each bracket has a short horizontal wing (9a) at the top facing a bottom edge of the top belt (8a) on which it is fixed; said wing (9a) has a bottom edge slanted backwards towards the bottom belt, so that the bottom edge mates with a long wing (9c), the long wing inclining forwardly and having an end fixed to the bottom belt.

5. An overhead conveyor belt system for sorting items loaded randomly according to claim 1, wherein the conveyor belt has a top chain (10) and a segmented bottom belt (11) joined by a series of brackets (9); each of said brackets (9) having a top and a bottom, the top of the bracket being fixed to the chain, the bottom belt having a series of successive segments (11a), each segment rotatable within the same vertical plane the segmented belt (11) being hingeably connected to the bottom of the respective brackets.

6. An overhead conveyor belt system, for sorting items loaded randomly, according to claim 1, wherein the openings of the conveyor belt each have a bottom side (5b), the bottom side (5b) of these openings (5) being slanted downwards and backward with respect to the moving direction of the belt.

* * * * *